US011668667B2

(12) United States Patent
Kumpiranont et al.

(10) Patent No.: US 11,668,667 B2
(45) Date of Patent: Jun. 6, 2023

(54) MICRO-ACTUATOR DEFECT DETECTION VIA TEMPERATURE

(71) Applicant: Seagate Technology LLC, Fremont, CA (US)

(72) Inventors: Thanongchai Kumpiranont, Korat (TH); Tappakorn Saktweewanid, Sung Noen (TH)

(73) Assignee: Seagate Technology LLC, Fremont, CA (US)

( * ) Notice: Subject to any disclaimer, the term of this patent is extended or adjusted under 35 U.S.C. 154(b) by 201 days.

(21) Appl. No.: 16/912,356

(22) Filed: Jun. 25, 2020

(65) Prior Publication Data
US 2021/0404981 A1 Dec. 30, 2021

(51) Int. Cl.
*G01N 25/72* (2006.01)
(52) U.S. Cl.
CPC ..................... *G01N 25/72* (2013.01)
(58) Field of Classification Search
CPC ....................................................... G01N 25/72
See application file for complete search history.

(56) References Cited

U.S. PATENT DOCUMENTS

| 6,399,948 | B1 | 6/2002 | Thomas et al. |
| 6,698,288 | B2 | 3/2004 | Shirzad et al. |
| 7,199,367 | B2 | 4/2007 | Favro et al. |
| 10,571,415 | B2 | 2/2020 | Shi |
| 2004/0089811 | A1 | 5/2004 | Lewis et al. |
| 2011/0216437 | A1* | 9/2011 | Mathur .................. G11B 19/02 |

FOREIGN PATENT DOCUMENTS

DE 102015208367 A1 * 11/2016
JP H0529676 A * 2/1993

OTHER PUBLICATIONS

Unknown Author(S), "Thermographic camera," Wikipedia, retrieved from "https://en.wikipedia.org/w/index.php?title=Thermographic_camera&oldid=959444389" as last edited on May 28, 2020.

* cited by examiner

*Primary Examiner* — Mirellys Jagan
(74) *Attorney, Agent, or Firm* — Faegre Drinker Biddle & Reath LLP

(57) ABSTRACT

A method is disclosed for determining whether piezoelectric materials have defects such as cracks. The method includes applying a voltage signal to a piezoelectric micro-actuator, measuring a temperature of the piezoelectric micro-actuator while applying the voltage signal, and determining that the piezoelectric micro-actuator includes a defect based on the measured temperature.

19 Claims, 5 Drawing Sheets

MICRO-ACTUATOR DEFECT DETECTION VIA TEMPERATURE

SUMMARY

In certain embodiments, a method includes applying a voltage signal to a piezoelectric micro-actuator, measuring a temperature of the piezoelectric micro-actuator while applying the voltage signal, and determining that the piezoelectric micro-actuator includes a defect based on the measured temperature.

In certain embodiments, a test system includes a fixture that is configured to removably couple to an apparatus comprising a piezoelectric element. The test system further includes an infrared camera having a lens directed towards the fixture and a voltage source configured to apply a voltage at an alternating frequency to the piezoelectric element. A computer is communicatively coupled to the infrared camera and to the voltage source. The computer is configured to receive measured temperatures of the piezoelectric element from the infrared camera and determine whether the measured temperatures are greater than a threshold.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
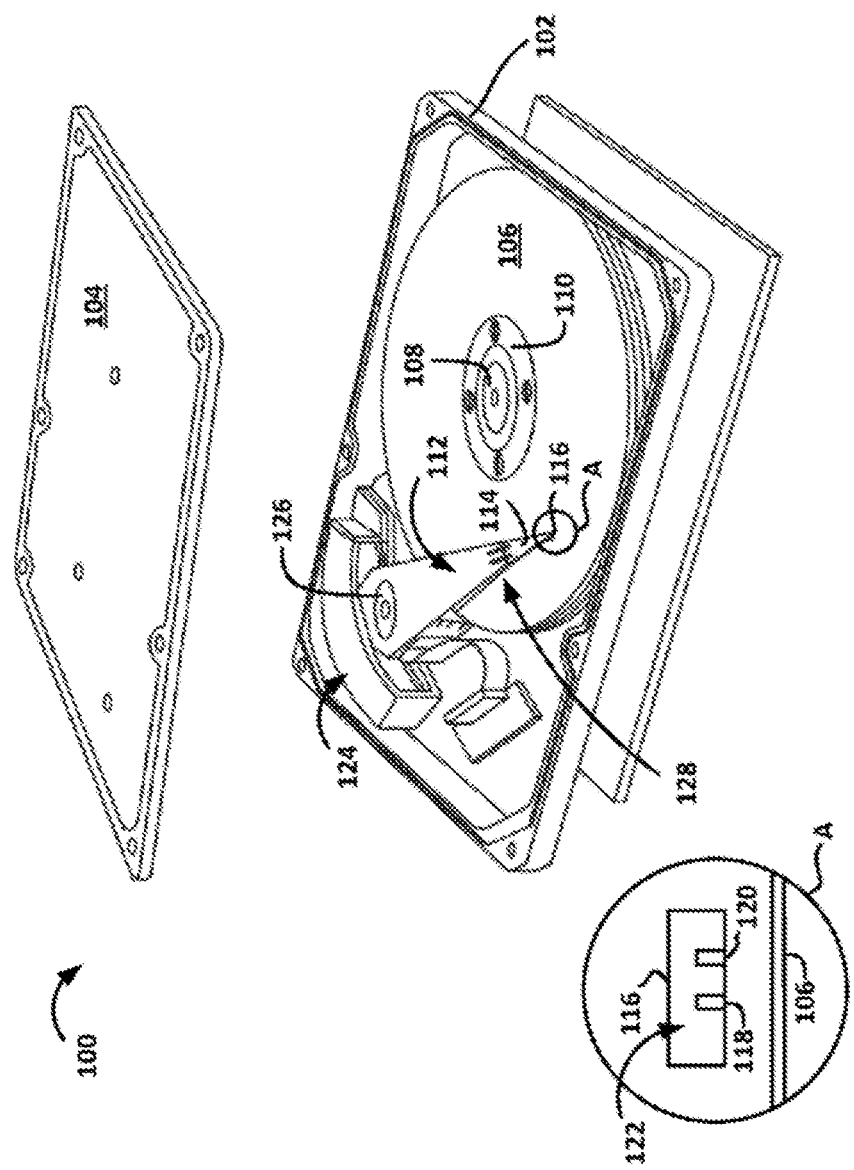
FIG. 1 shows a perspective schematic view of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Piezoelectric materials can be used to create micro-actuators that expand or contract in response to applying positive or negative voltages to the piezoelectrical materials. For example, certain hard disk drives use micro-actuators that help position read/write heads above a desired data track on a magnetic recording medium. The micro-actuators are made of a ceramic piezoelectric material that—due to its brittleness—can crack under force during manufacture. Current approaches for detecting cracks or defects such as by visual inspection can be expensive and time consuming. Certain embodiments of the present disclosure are accordingly directed to detecting defects such as cracks in piezoelectric materials. Although the piezoelectric materials are described below as being incorporated into hard disk drives, the approaches for detecting defects can be used for piezoelectric materials used in other applications and environments.

FIG. 1 shows an exploded, perspective view of a hard drive 100 having a base deck 102 and top cover 104. The hard drive 100 includes magnetic recording discs 106 coupled to a spindle motor 108 by a disc clamp 110. The hard drive 100 also includes an actuator assembly 112 coupled to a suspension assembly 114 that suspends read/write heads 116 (only one read/write head 116 is shown in FIG. 1) over the magnetic recording discs 106. Together, the suspension assembly 114 and the read/write heads 116 may be referred to as a head-suspension assembly or an "HSA."

As shown in inset A—a close-up view of the read/write head 116 positioned above the magnetic recording disc 106—the read/write head 116 may include multiple transducers, including write elements 118 that write data to data tracks of the magnetic recording discs 106 and read elements 120 that read data from the data tracks (hereinafter the write and read elements 118, 120 are referred to interchangeably as the transducer 122). In operation, the spindle motor 108 rotates the magnetic recording discs 106 while the actuator assembly 112 is driven by a voice coil motor assembly 124 that rotates the actuator assembly 112 around a pivot bearing 126.

The actuator assembly 112 also includes a micro-actuator 128 positioned at least partially on or between the suspension assembly 114 and the read/write head 116. A servo control system controls the voice coil motor assembly 124 and the micro-actuator 128 to position the read/write heads 116 (and therefore the transducer 122) over a desired track on the magnetic recording discs 106 for reading and writing operations.

Figure 2:
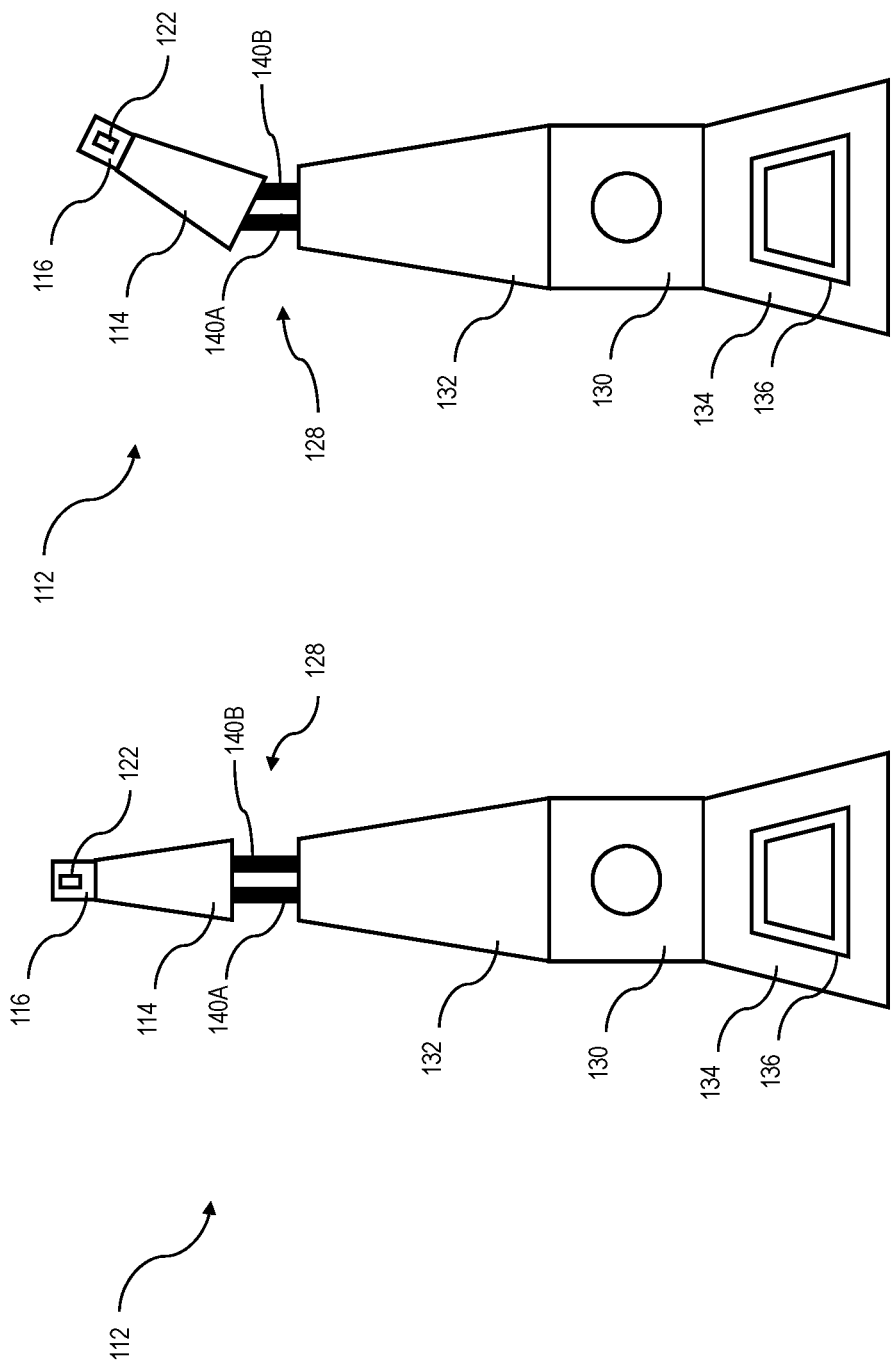
FIGS. 2A and 2B show top schematic views of an actuator assembly at different positions, in accordance with certain embodiments of the present disclosure.

FIGS. 2A and 2B show top, schematic views of the actuator assembly 112 with the micro-actuator 128 at different positions. The actuator assembly 112 has an actuator body portion 130 from which a plurality of arms 132 and a voice coil shelf 134 extend from the actuator body portion 130. The voice coil shelf 134 is coupled to a coil 136, which may include a wound conductive wire (e.g., copper wire) through which current is applied. In operation, positioning of the actuator assembly 112 is controlled by the applied current through the coil 136 which generates a magnetic field that interacts with magnetic fields of permanent magnets (not shown) of the voice coil motor assembly 124 and that are spaced apart from the coil 136.

The arm 132 is shown as being proximal to the actuator body portion 130 and coupled to the suspension assembly 114 (distal to the actuator body portion 130) by the micro-actuator 128. However, it is appreciated that the micro-actuator 128 may be positioned anywhere on or between a read/write head 116 and the actuator body portion 130. For example, the micro-actuator 128 may be positioned between the suspension assembly 114 and a read/write head 116. In certain embodiments, the suspension assembly 114 is separated into multiple sections and the micro-actuator 128 may be positioned between the multiple sections. Moreover, the actuator assembly 112 may include multiple sets of micro-actuators 128. For example, the hard drive 100 may utilize a dual- or triple-stage actuation system, which may refer to a number of actuation systems (e.g., voice coil motor assembly, micro-actuators) used by the hard drive 100 to position the transducer 122. The suspension assembly 114 is coupled to the read/write head 116.

As previously mentioned, the voice coil motor assembly 124 (including the coil 136) and micro-actuator 128 are arranged to carry out various positioning operations (e.g., track seeking, track settling, track following) that position the read/write heads 116 (and therefore the transducer 122) over a desired track of the magnetic recording disc 106 to read data from or write data to the desired track of the magnetic recording disc 106. For example, in response to a command to read data from or write data to a track different from where the transducer 122 is currently positioned (i.e., a track seeking operation), a current may be applied to the coil 136 of the voice coil motor assembly 124 to rotate the actuator assembly 112 (and therefore the transducer 122) towards the desired track.

As the transducer 122 nears the desired track, the micro-actuator 128 may be activated to assist the voice coil motor assembly 124 with settling over the desired track (i.e., a track settling operation). For example, the micro-actuator 128 can include elements 140A and 140B formed of piezoelectric material such as a lead-zirconate-titanate (PZT) material. When a positive voltage is applied to the PZT elements 140A and 140B, the PZT elements 140A and 140B expand (e.g., lengthen). When a negative voltage is applied to the PZT elements 140A and 140B, the PZT elements 140A and 140B contract (e.g., shorten).

As shown in FIG. 2B, a positive voltage can be applied to one of the PZT elements 140A to lengthen the PZT element 140A while a negative voltage can be applied to the other PZT element 140B to shorten the PZT element 140B. As such, the suspension assembly 114 (and therefore the transducer 122) can be pivoted to one side or the other. Once the transducer 122 is positioned over the desired track, the micro-actuator 128 may be used to compensate for small positioning errors to keep the transducer 122 over the desired track (i.e., a track following operation).

As noted above, during manufacture, the PZT elements 140A and 140B can develop cracks, which negatively affects their performance and which may eventually lead to the micro-actuator 128 failing. For example, when one of the PZT elements 140A and 140B are cracked, the cracked PZT element may not lengthen or shorten at the desired rate. In addition to cracks, the PZT elements 140A and 140B can develop defects such as conductive electrode pads coupled to the PZT elements 140A and 140B lifting or becoming uncoupled to the PZT elements 140A and 140B. One approach for detecting defective PZT elements is by visual inspection, but visual inspection can be expensive, time consuming, and challenging to identify small defects.

Figure 3:
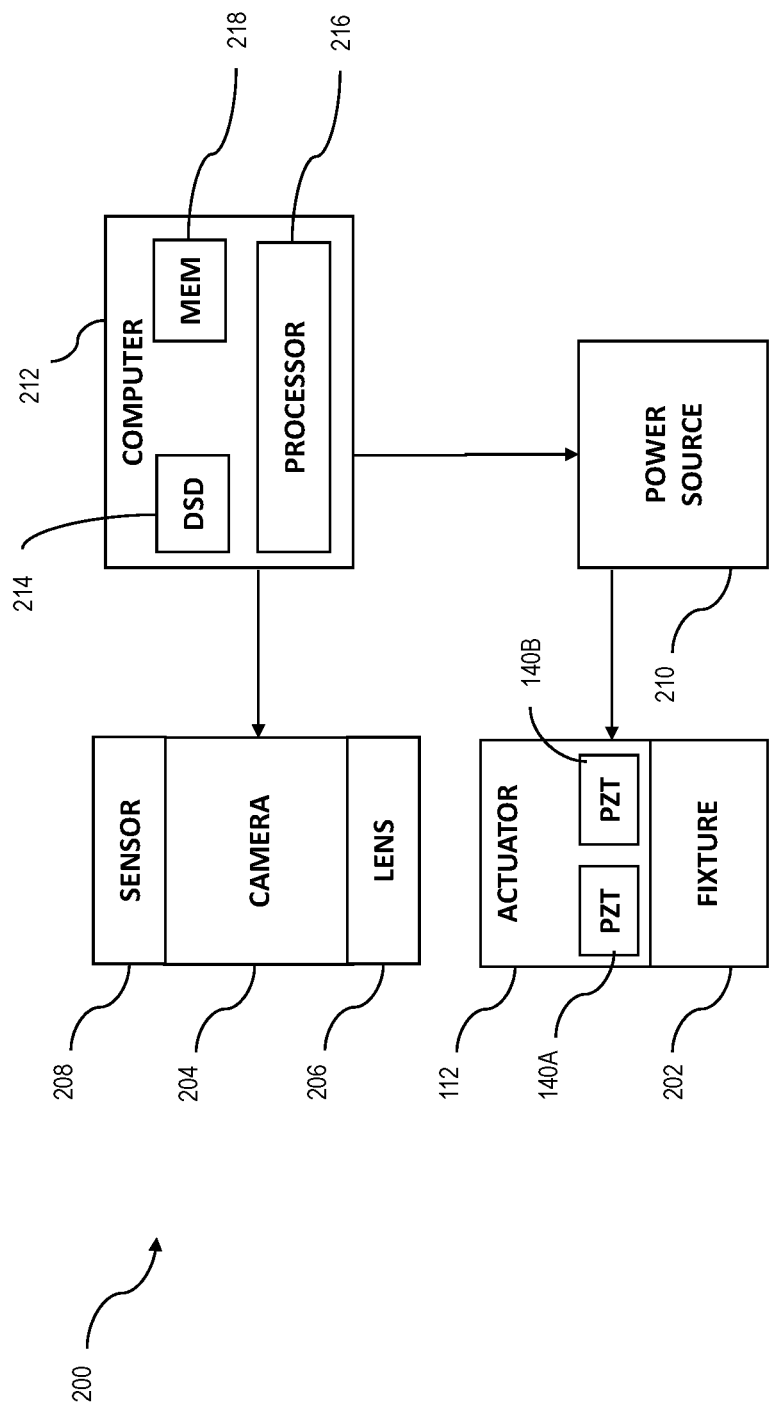
FIG. 3 shows a schematic block diagram of a test system, in accordance with certain embodiments of the present disclosure.

FIG. 3 shows a schematic of a test system 200 for detecting defects in piezoelectric elements such as the PZT elements 140A and 140B that form a piezoelectric micro-actuator. As will be discussed in more detail below, the test system 200 applies an electrical signal to the PZT elements 140A and 140B and measures the temperatures of the PZT elements 140A and 140B. Based on the temperatures (including the rate of temperatures increasing) of the PZT elements 140A and 140B (or portions of the PZT elements 140A and 140B), it can be determined whether the PZT elements 140A and 140B have or likely have at least one defect. More specifically, increased temperatures are indicative that the PZT elements 140A and 140B have at least one defect.

The test system 200 includes a fixture 202 that is arranged to removably couple to one or more piezoelectric elements themselves or to removably couple to one or more apparatuses (e.g., the actuator assembly 112 or the suspension assembly 114 of FIG. 1) that include one or more piezoelectric elements (e.g., that form a piezoelectric micro-actuator). For example, the fixture 202 can include one or more clamps that can be controlled to open to accept (or to release) the actuator assembly 112 and to close to secure the actuator assembly 112 on the fixture 202. The actuator assembly 112 (or another type of apparatus) is coupled to the fixture 202 such that the piezoelectric elements are free to lengthen and shorten.

The test system 200 also includes an infrared camera 204. The infrared camera 204 includes a lens 206 that is directed towards the fixture 202. The infrared camera 204 includes a sensor 208 that can detect infrared energy (e.g., electromagnetic energy in the range of approximately 1,000 nm to approximately 14,000 nm). The higher the temperature of an object or one or more portions of an object, more infrared energy (or radiation) is emitted by the object or portion(s). The infrared camera 204 is configured to detect this infrared energy. Although the infrared camera 204 is described herein, the infrared camera 204 could be other types of devices that are capable of measuring temperature without contacting the target being measured.

The test system 200 also includes a power source 210. In certain embodiments, the power source 210 is configured to apply a voltage at an alternating frequency. For example, the power source 210 can be an arbitrary waveform generator. The power source 210 can be communicatively coupled to a computer 212 of the test system 200. The computer 212 is also communicatively coupled to the infrared camera 204. The computer 212 can control the power source 210 and the signals generated by the power source 210. For example, the computer 212 can control the timing of when the power source 210 generates electrical signals, the amplitude of the electrical signals, and the frequency of the electrical signals (e.g., the frequency of alternating voltage signals).

In the embodiment of FIG. 3, the power source 210 is electrically coupled to the PZT elements 140A and 140B on the actuator assembly 112. For example, the PZT elements 140A and 140B may be coupled to electrical conductors that, on one end, have electrodes coupling the electrical conductors to the PZT elements 140A and 140B and that, on the other end, have bond pads that can be coupled to outputs of the power source 210. The PZT elements 140A and 140B may have an input electrode on one end and an output electrode on the other end.

The power source 210 outputs a voltage signal with an alternating frequency which is injected to or applied to the PZT elements 140A and 140B. As noted above, the PZT elements 140A and 140B can form a piezoelectric actuator. As such, the voltage signal can be applied to a piezoelectric micro-actuator. When the voltage signal is applied to the PZT elements 140A and 140B, the PZT elements 140A and 140B are activated and will lengthen and shorten according to (or responsive to) the alternating voltage signal. In certain embodiments, the frequency of the voltage signal that induces a resonant frequency of the PZT elements 140A and 140B which can be determined empirically. For example, the impedance of the PZT elements 140A and 140B can be measured as a function of frequency to determine resonance modes. In certain embodiments, the PZT elements 140A and 140B have multiple resonant frequencies, so the power source 210 can cycle through multiple different frequencies for the voltage signal. Determining the frequencies can be performed for different actuator designs, and the determined frequencies for each actuator design can be stored to the memory 218 and applied in a testing routine without needing to determine the frequencies for each future individual actuator or batch of actuators. In certain embodiments, the frequency of the voltage signal is 1-3 Mhz.

The temperature of the PZT elements 140A and 140B will increase once activated. The inventors of the present disclosure have found that the temperatures of the PZT elements 140A and 140B with a defect will be greater than the PZT elements 140A and 140B without a defect. Further, the temperature of the PZT elements 140A and 140B with a defect will increase faster than those without defects.

The temperatures of the PZT elements 140A and 140B (before and during activation) can be measured by the infrared camera 204. The measured temperatures can be communicated to the computer 212 and stored on a data storage device 214 (e.g., hard disk drive, solid state drive) of the computer 212.

The computer 212 can include a processor 216 communicatively coupled to memory 218. The memory 218 can store various instructions for carrying out test routines. For example, the instructions can include steps for identifying which of the measured temperatures exceed a threshold.

In certain embodiments, the threshold is a maximum temperature where measured temperatures exceeding that maximum will automatically be associated with a defective PZT element. The specific maximum temperature will vary depending on the characteristics of the tested piezoelectric micro-actuators and characteristics of the applied voltages (e.g., amplitude and frequency). For example, the higher the applied amplitude and/or frequency of the voltage signal, the higher the temperatures of the activated PZT elements will be, generally, for both defective and defect-free PZT elements. This specific maximum temperature can be developed empirically by comparing temperatures of piezoelectric micro-actuators that are known to have defects with those that are known not to have defects.

In certain embodiments, the threshold is a maximum temperature rate (e.g., temperature increase per second) where temperature rates exceeding that maximum rate will be automatically associated with a defective PZT element. The specific maximum temperature rate will vary depending on the characteristics of the tested piezoelectric micro-actuators and characteristics of the applied voltages. This specific maximum temperature rate can be developed empirically by comparing temperature rate increases of piezoelectric micro-actuators that are known to have defects with those that are known not to have defects.

The computer 212 (e.g., via the processor 216) can compare the measured temperatures of the PZT elements 140A and 140B against the thresholds. For each PZT element having a temperature that exceeds the threshold, the computer 212 can determine those PZT elements as having a defect. In certain embodiments, the measured temperature used to compare against the thresholds is the maximum measured temperature along each PZT element. In certain embodiments, the maximum temperature is the maximum temperature along the entire PZT elements. The maximum measured temperature can be used because the temperature along a PZT element will vary along each PZT element. For example, the portions of the PZT element that do not have a defect will have a lower temperature than the portions with a defect. As such, using the maximum measured temperature filters out the lower measured temperatures. This maximum measured temperature can be used to determine the maximum rate of temperature increases.

As noted above, the power source 210 may be controlled by the computer 212 to apply, over time, separate voltage signals at different frequencies (e.g., three different frequencies). In such embodiments, the maximum temperature and/or maximum temperature rates of the PZT elements 140A and 140B can be measured for each of the applied voltage signals.

For actuators with piezoelectric actuators determined to have a defect, those actuators can be reworked and the one or more defective PZT elements can be replaced with a new PZT element. The reworked actuator can then be retested in the test system 200.

Figure 4:
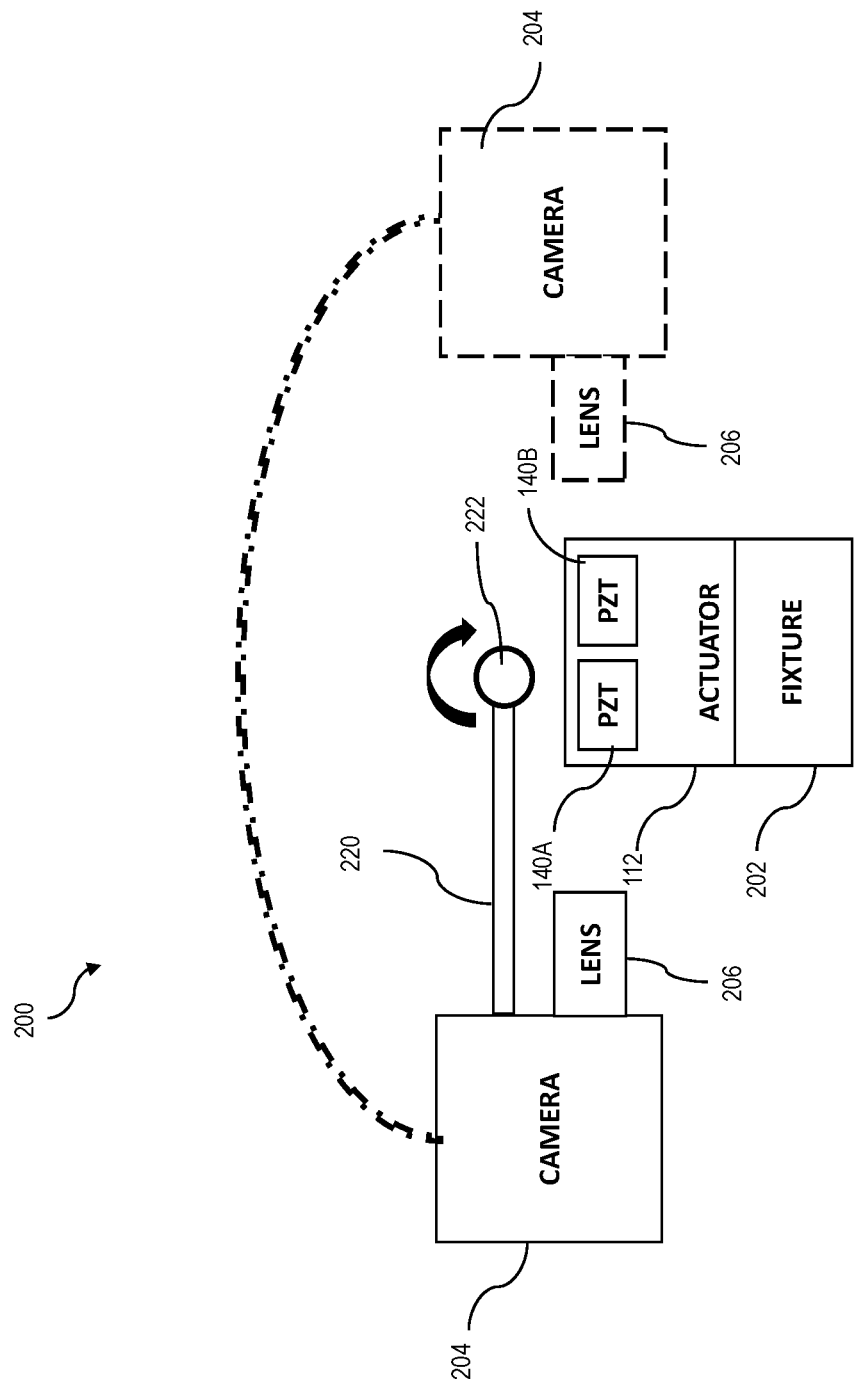
FIG. 4 shows an alternative arrangement of the test system of FIG. 3, in accordance with certain embodiments of the present disclosure.

FIG. 4 shows an alternative arrangement of various components of the test system 200. For simplicity, not all components shown in FIG. 3 are shown in FIG. 4. The test system 200 is shown as including a rotatable arm 220 that is coupled to the infrared camera 204 on one end and to a motor 222 on the other end. When the motor 222 rotates, the rotatable arm 220 rotates which in turn rotates the infrared camera 204. As such, the infrared camera 204 is capable of being positioned at different points around the fixture 202 and/or the target (e.g., the actuator assembly 112 in the example of FIGS. 3 and 4).

In certain embodiments, the test system 200 carries out a routine where the rotatable arm 220 is positioned such that the infrared camera 204 is first positioned on one side of the fixture 202 and the lens 206 is pointed towards the fixture 202. With the infrared camera 204 at this position, the test system 200—via the power source 210—applies a voltage signal to the piezoelectric elements coupled to the fixture 202. While the voltage signal is applied, the infrared camera 204 measures the temperatures of the piezoelectric elements. In certain embodiments, the power source 210 applies a series of individual voltage signals each with different alternating frequencies.

Once the temperatures have been measured, the motor 222 rotates the rotatable arm 220 (e.g., rotates 180 degrees) such that the infrared camera 204 is positioned on an opposite side of the fixture 202 and the lens 206 is pointed towards the fixture 202. With the infrared camera 204 at this second position, the test system 200—via the power source 210—applies a voltage signal to the piezoelectric elements coupled to the fixture 202. While the voltage signal is applied, the infrared camera 204 measures the temperatures of the piezoelectric elements.

The measured temperatures (or temperature rate increases) are compared to thresholds to determine whether and which piezoelectric elements have defects such as cracks.

Figure 5:
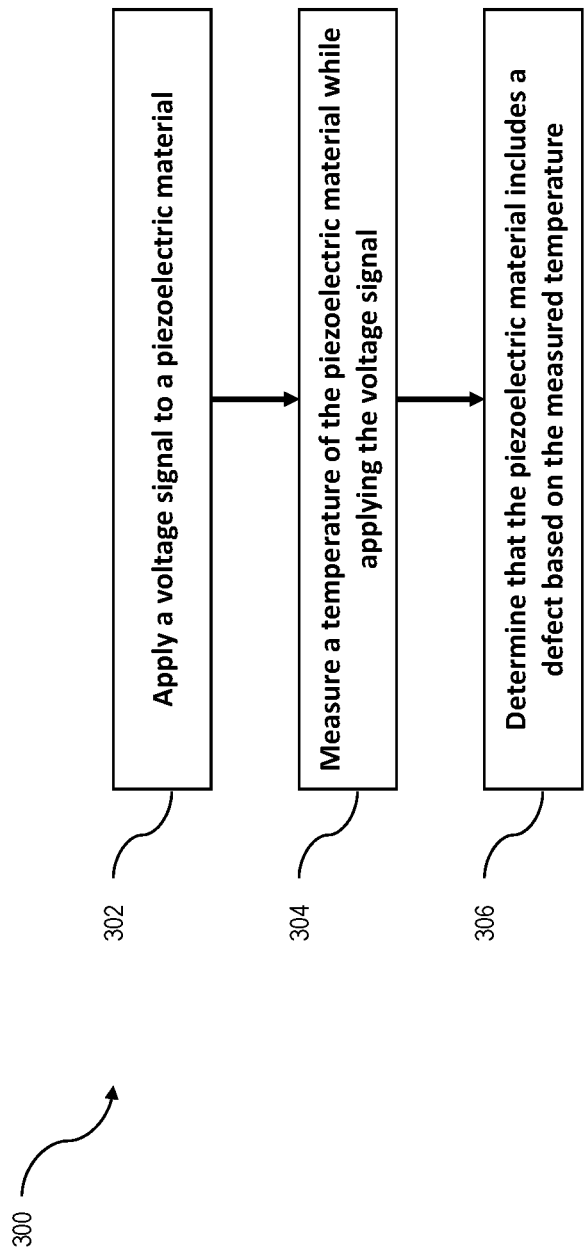
FIG. 5 shows a block diagram of steps of a method, in accordance with certain embodiments of the present disclosure.

FIG. 5 outlines steps of a method 300 for detecting defects of piezoelectric materials. The method includes applying a voltage signal to a structure that comprises a piezoelectric material (block 302 in FIG. 5). The method 300 further includes measuring a temperature of the piezoelectric material while applying the voltage signal (block 304 in FIG. 5). The method 300 further includes determining that the piezoelectric material includes a defect based on the measured temperature (block 306 in FIG. 5).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
   applying a voltage signal to a piezoelectric micro-actuator;
   measuring a temperature of the piezoelectric micro-actuator while applying the voltage signal, wherein the measuring of the temperature includes measuring the temperature via an infrared camera; and
   determining that the piezoelectric micro-actuator includes a defect based on the measured temperature.

2. The method of claim 1, wherein the infrared camera is rotatable around the piezoelectric micro-actuator.

3. The method of claim 1, where the piezoelectric micro-actuator includes two piezoelectric elements.

4. The method of claim 1, wherein the piezoelectric micro-actuator is attached to a head-suspension assembly.

5. The method of claim 1, wherein the measuring of the temperature includes measuring the temperature of the piezoelectric micro-actuator along opposite sides of the piezoelectric micro-actuator.

6. The method of claim 1, wherein the voltage signal has an alternating frequency.

7. The method of claim 6, wherein the alternating frequency is 1-3 Mhz.

8. The method of claim 1, wherein the measured temperature includes a maximum temperature rate, wherein the determining that the piezoelectric micro-actuator includes the defect is based on comparing an increase in the maximum temperature rate to a threshold rate.

9. The method of claim 8, wherein the increase in the maximum temperature rate is the increase in the maximum temperature rate along the entire piezoelectric micro-actuator.

10. The method of claim 1, wherein the measured temperature includes a maximum temperature, wherein the determining that the piezoelectric micro-actuator includes the defect is based on comparing the maximum temperature to a threshold.

11. The method of claim 10, wherein the maximum temperature is the maximum temperature along the entire piezoelectric micro-actuator.

12. The method of claim 1, wherein a test system includes:
    a fixture configured to removably couple to an apparatus comprising the piezoelectric micro-actuator;
    the infrared camera having a lens directed towards the fixture;
    a voltage source configured to apply the voltage signal at an alternating frequency to the piezoelectric micro-actuator; and
    a computer communicatively coupled to the infrared camera and to the voltage source, the computer being configured to receive the measured temperature of the piezoelectric micro-actuator from the infrared camera and determine whether the measured temperature is greater than a threshold.

13. The method of claim 12, wherein the threshold is a maximum temperature rate increase.

14. The method of claim 13, wherein the maximum temperature rate increase is compared to the maximum measured temperature rate increase along the entire piezoelectric micro-actuator.

15. The method of claim 12, further comprising a rotatable arm coupled to the infrared camera.

16. The method of claim 15, further comprising: rotating the rotatable arm to rotate the infrared camera between a first position and a second position.

17. The method of claim 16, wherein the first position and the second position are on opposite sides of the fixture.

18. The method of claim 16, wherein the rotatable arm rotates the infrared camera approximately 180 degrees.

19. The method of claim 16, wherein the rotatable arm is coupled to a motor on one end and the infrared camera on the other end.

* * * * *